United States Patent
Van Wetten et al.

[19]

[11] Patent Number: 5,868,120
[45] Date of Patent: Feb. 9, 1999

[54] FUEL VAPOR MANAGEMENT SYSTEM FOR MOTOR VEHICLES

[75] Inventors: Richard J. Van Wetten; John Edward Cook; Ronald Hunter, all of Chatham, Canada

[73] Assignee: Siemens Canada Limited, Ontario, Canada

[21] Appl. No.: 884,250

[22] Filed: Jun. 30, 1997

[51] Int. Cl.[6] ........................................... F02M 33/04
[52] U.S. Cl. ........................................................ 123/518
[58] Field of Search ................................. 123/514, 516, 123/518, 519, 198 D; 220/86.2

[56] References Cited

U.S. PATENT DOCUMENTS

| | | | |
|---|---|---|---|
| 2,609,188 | 9/1952 | Brehob | 261/72 |
| 3,477,611 | 11/1969 | Niles | 220/86 |
| 3,617,034 | 11/1971 | Skinner | 261/22 |
| 3,648,886 | 3/1972 | Pringle | 220/85 |
| 3,693,825 | 9/1972 | Richman | 220/26 R |
| 3,747,800 | 7/1973 | Viland | 220/85 B |
| 3,752,355 | 8/1973 | Weissenbach | 220/86 R |
| 3,949,720 | 4/1976 | Zipprich et al. | 123/136 |
| 3,977,379 | 8/1976 | Weissenbach | 123/136 |
| 4,615,455 | 10/1986 | Tansill | 220/88 R |
| 4,852,765 | 8/1989 | Lyzohub | 220/461 |
| 4,880,135 | 11/1989 | Neou | 220/85 VS |
| 5,056,493 | 10/1991 | Holzer | 123/518 |
| 5,090,459 | 2/1992 | Aoki et al. | 141/59 |
| 5,460,135 | 10/1995 | Ohashi et al. | 123/518 |
| 5,524,786 | 6/1996 | Skudlarek | 220/86.2 |
| 5,596,971 | 1/1997 | Kidokoro | 123/518 |
| 5,722,374 | 3/1998 | Kidokoro et al. | 123/518 |

*Primary Examiner*—Thomas N. Moulis

[57] ABSTRACT

When a tank filler tube cap is closed, several flow paths having solenoid-operated valves are selectively operated by an engine management computer to control pressurizing of a bladder disposed in a fuel tank and of surrounding fuel vapor space not occupied by the bladder to attenuate fuel vapor generation. Venting of the bladder to atmosphere and of the vapor headspace to a canister are also controlled. The control further regulates the pressure in the bladder relative to that in the vapor headspace. On-board testing for leakage can be automatically accomplished for ascertaining compliance with relevant regulations. When the tank is to be re-fueled, a signal is sent to the computer. If conditions, as sensed by certain sensors, are appropriate, the computer unlatches an access door to the filler tube cap so that upon removal of the cap, no significant pressure differential that might cause vapor to be expelled from the tank to atmosphere, or impede the filling of the tank with fuel from the nozzle, is present. As liquid fuel is dispensed into the tank, the combined volumes of the bladder and the tank vapor headspace are reduced by the volume of liquid fuel introduced into the tank. The headspace cannot be re-pressurized until the cap again closes the filler tube.

31 Claims, 3 Drawing Sheets

FUEL VAPOR MANAGEMENT SYSTEM
OPERATIONAL CONTROL LOGIC

| | INPUTS TO LOGIC ||| OUTPUTS |||||
|---|---|---|---|---|---|---|---|---|
| OPERATING MODES | TANK PRESSURE GAGE 98 | TANK BLADDER PRESSURE GAGE 100 | RESERVOIR PRESSURE GAGE 102 | BLADDER PRESSURE VALVE 84 | TANK PRESSURE VALVE 82 | BLADDER VENT VALVE 86 | TANK VENT VALVE 70 | REFUEL VENT VALVE 72 | COMPRESSOR 78 |
| *NORMAL OPERATIONS* | | | | | | | | | |
| TANK PRESSURE HIGH | >27 | | | CLOSED | CLOSED | CLOSED | OPENS | CLOSED | |
| TANK PRESSURE LOW | <20 | | | CLOSED | OPENS | CLOSED | CLOSED | CLOSED | |
| INTRA P HIGH | | >1.25 | | CLOSED | CLOSED | OPENS | CLOSED | CLOSED | |
| INTRA P LOW | | | | OPENS | CLOSED | CLOSED | CLOSED | CLOSED | |
| RESERVOIR PRESSURE LOW | | | <35 | CLOSED | CLOSED | CLOSED | CLOSED | CLOSED | ON |
| | | | | | | | | | |
| *FUELING SEQUENCE* | | | | | | | | | |
| PRESS REFUEL BUTTON | 20-27 | 0.5-1.25 | | CLOSED | CLOSED | OPENS | OPENS | CLOSED | |
| PRESSURE GOES LOW | <0.5 | | | CLOSED | CLOSED | OPEN | OPEN | OPEN | |
| START REFUELING | <0.5 | | | CLOSED | CLOSED | OPEN | OPEN | OPEN | |
| REPLACE FUEL CAP | <0.5 | | | CLOSED | CLOSED | CLOSES | CLOSES | CLOSES | |
| CLOSE FUEL DOOR | <0.5 | | | OPENS | OPENS | CLOSED | CLOSED | CLOSED | |
| PRESSURIZING | SEE ABOVE | SEE ABOVE | SEE ABOVE | SEE ABOVE | SEE ABOVE | CLOSED | CLOSED | CLOSED | |

FIG. 2B

| FUEL DOOR 78 | EXPLANATION |
|---|---|
|  | TANK VENT VALVE OPENS UNTIL TANK PRESSURE <23 |
|  | TANK PRESSURE VALVE OPENS UNTIL TANK PRESSURE >23 |
|  | BLADDER VENT VALVE OPENS UNTIL PRESSURE <1.5 |
|  | BLADDER PRESSURE VALVE OPENS UNTIL PRESSURE >1.5 |
|  | COMPRESSOR COMES ON UNTIL PRESSURE >200 |
|  | VENT VALVES OPEN TO RELIEVE PRESSURE (ONLY IF ENGINE OFF) |
| OPENS | WHEN TANK PRESSURE <0.5, THEN REFUEL VALVE AND FUEL DOOR OPEN |
| OPEN | VENT VALVES REMAIN OPEN |
| OPEN | VENT VALVES CLOSE |
| CLOSES | PRESSURE VALVES OPEN TO PRESSURIZE TANK AND BLADDER |
|  | PRESSURE VALVES OPEN PER "NORMAL OPERATIONS" LOGIC (ONLY IF FUEL DOOR AND CAP ARE CLOSED) |

FUEL VAPOR MANAGEMENT SYSTEM FOR MOTOR VEHICLES

FIELD OF THE INVENTION

This invention relates generally to on-board emission control systems for internal combustion engine powered motor vehicles, and more particularly to a fuel vapor management system for more efficiently attenuating the volatilization of volatile liquid fuel in a fuel tank of a motor vehicle.

BACKGROUND AND SUMMARY OF THE INVENTION

Known types of on-board fuel vapor management systems (sometimes called evaporative emission control systems) comprise a vapor collection canister that collects fuel vapor emitted from a tank containing volatile liquid fuel for the engine. A canister purge solenoid (CPS) valve periodically purges collected vapor to an intake manifold of the engine where it entrains with induction air or an induction air-fuel charge for combustion in the engine combustion chamber space. The CPS valve may comprise a solenoid that is under the control of a microprocessor-based engine management system. The sizes of various components of these vapor management systems must be adequate to handle the anticipated maximum rate of fuel volatilization, i.e. vapor generation. In general, the sizes of these various components must be made larger as the anticipated maximum rate of fuel volatilization becomes larger, and/or more highly volatile fuels are used. Consequently, increased component cost is apt to follow. By the same token, increased space in the vehicle for larger components is apt to be required, and this imposes constraints of the packaging design of a new vehicle. Minimizing the size of these emission control system components is therefore desirable.

The anticipated increased usage of more volatile liquid fuels, such as methanol and ethanol for example, imposes further demands on the design of on-board fuel vapor management systems.

Heretofore, it has been proposed to confine volatile fuel in a vehicle's fuel tank in ways that reduce the tendency of the fuel to vaporize. Reference may be had to various patents, such as U.S. Pat. Nos. 3,477,611; 5,460,135; and 5,146,902 for example. Generally speaking, vapor generation may be attenuated in several different ways. One is by an enclosure, such as a bladder or diaphragm for example, arranged within a fuel tank to reduce the volume of the vapor headspace in the tank and/or to reduce the surface area of the liquid fuel, as in the first two of the three referenced patents. Another is to pressurize the headspace to a superatmospheric pressure as in the third of the three referenced patents. It may also be important to avoid vapor escape through the tank fill when it is opened for re-fueling.

SUMMARY OF THE INVENTION

The present invention provides an improved system for attenuating the volatilization of liquid fuel in a tank without interfering with customary procedures for re-fueling fueling of the tank. The present invention provides for compliance of such a system with applicable governmental anti-pollution regulations. For a given standard of compliance, the invention can provide a cost- and space-effective design that can significantly reduce the size of certain evaporative emission system components, such as a vapor collection canister for example. Although the inventive system embodies a combination of components new to evaporative emission control systems, these components can be relatively compact and inexpensive. Thus, important functional benefits can be cost-effectively achieved by the present invention even though several additional components are employed.

The inventive principles involve a number of different aspects, a general one of which is defined by: 1) a variable volume, fuel-impermeable enclosure, such as a bladder that is employed in the embodiment disclosed herein, disposed within the tank interior volume to reduce the volume of the tank headspace that can be occupied by fuel vapor by the volume of the enclosure; 2) a source of environmentally non-hazardous gas at superatmospheric pressure; and 3) a combination of various flow paths under the control of an electric controller, such as an engine management computer (EMC), for selectively introducing superatmospheric pressure gas from the gas source into the tank headspace to pressurize the tank headspace to superatmospheric pressure and into the variable volume, fuel-impermeable enclosure to pressurize it to superatmospheric pressure and for selectively venting the variable volume, fuel-impermeable enclosure to atmosphere and the tank headspace to a vapor collection system, wherein the selective pressurizing and venting functions are performed by valves, solenoid-operated valves in the embodiment disclosed herein, controlled by the engine management computer in accordance with various inputs to it. These inputs include various pressure sensors associated with the variable volume, fuel-impermeable enclosure and that portion of the tank headspace that is not occupied by the variable volume fuel-impermeable enclosure. Additional sensors are associated with a removable filler tube closure and with a door that allows and disallows access to the filler tube closure. The EMC is typically microprocessor-based, and interfacing circuits interface the microprocessor with the valves.

In a presently preferred embodiment disclosed herein, the gas source comprises an air tank for storing superatmospheric pressure air and a compressor, or pressurizing pump, for pumping atmospheric air into the air tank to create superatmospheric pressure air in the air tank. The several flow paths comprise several solenoid-operated valves that are selectively operated under the command of the EMC. When the tank filler tube closure is closed, sealing the tank from atmosphere, the valves can be operated to various conditions to pressurize the variable volume, fuel-impermeable enclosure and/or the tank headspace from the air tank, to vent the variable volume, fuel-impermeable enclosure to atmosphere, to vent the vapor-containing portion of the tank headspace to the vapor collection system, and/or to regulate the pressure in the variable volume, fuel-impermeable enclosure relative to that in the tank vapor headspace. The variable volume, fuel-impermeable enclosure is preferably a bladder configured such that the amount of tank headspace that it displaces is maximized to the extent appropriate for a given fuel tank geometry. The inventive system can function both during times of engine operation when the liquid fuel is being withdrawn from the tank to fuel the engine and during times of engine non-operation. Purging of fuel vapor from the portion of the headspace that contains fuel vapor to a collection canister of the vapor collection system can be accomplished at appropriate times via a tank headspace vent valve. On-board testing for leakage can also be automatically accomplished for ascertaining compliance with relevant regulations.

Another aspect of the invention provides for re-fueling by means of conventional procedures. When a vehicle is to be re-fueled from a liquid fuel dispensing pump nozzle at a service station, a signal is sent to the EMC, by pressing a switch for example. If conditions, as sensed by certain sensors, are appropriate, the EMC unlatches an access door to the filler tube closure (i.e. filler cap), which door must first be opened before the closure can be removed. An associated sensor sends an appropriate signal to the engine management computer to signal that the access door has opened. That in turn places certain valves in appropriate operating conditions to vent the variable volume, fuel-impermeable enclosure to atmosphere and to vent the headspace to the vapor collection system. Consequently, when the filler tube is subsequently opened upon removal of its closure, and the fuel dispensing nozzle properly inserted into the fill's entrance, no significant pressure differential that might cause vapor to be expelled from the tank to atmosphere, or impede the filling of the tank with fuel from the nozzle, is present. As liquid fuel is dispensed into the tank, the combined volumes of the variable volume, fuel-impermeable enclosure and the tank vapor headspace is reduced the volume of liquid fuel introduced into the tank.

Accordingly, one generic aspect of the invention relates to a tank defining an interior volume for holding volatile liquid fuel and for providing a headspace for volatilized fuel, and a system for attenuating the volatilization of liquid fuel in the tank interior volume which comprises: an enclosure that comprises a fuel-impermeable wall disposed within the tank interior volume and that is expandable and contractible in volume to reduce to the volume of the tank headspace for volatilized fuel by the volume of the enclosure; a source of environmentally non-hazardous gas at superatmospheric pressure; and a control for introducing superatmospheric pressure gas from the source both into the tank headspace to pressurize the tank headspace to superatmospheric pressure and into the enclosure to pressurize the enclosure to superatmospheric pressure.

Another generic aspect of the invention relates to a fuel vapor control and containment system for control and containment of volatilized fuel which comprises a variable volume enclosure disposed within the tank interior volume to reduce the volume of the tank headspace by the volume of the enclosure, a source of environmentally non-hazardous gas at superatmospheric pressure, plural controlled flow paths comprising a first controlled flow path for selectively communicating the tank headspace to the gas source, a second controlled flow path for selectively a third controlled flow path for selectively communicating the enclosure to the gas source, and a fourth controlled flow path for selectively communicating the enclosure to atmosphere, a sensor for distinguishing between the first condition and the second condition of the closure, wherein the fuel vapor control and containment system operates to i) allow the first, second, third, and fourth controlled flow paths to selectively control the respective flows when the closure is in its first condition, ii) to disallow the third controlled flow path from selectively communicating the enclosure to the gas source when the closure is in its second condition, and iii) disallow the first controlled flow path from selectively communicating the tank headspace to the gas source when the closure is in its second condition.

Yet another generic aspect of the invention relates to a control for pressurizing a headspace of the tank interior to superatmospheric pressure and for venting the headspace, a closure sensor for distinguishing between closed condition and open condition of the a filler neck closure, an access door that is selectively positionable to allow and disallow access to the closure, including a releasable latching mechanism for releasably latching the door closed to disallow access to the closure, an initiator for initiating unlatching of the door, a position sensor for distinguishing between an open position of the door that allows access to the closure and a closed position of the door that disallows access to the closure, a pressure sensor for sensing tank headspace pressure, and wherein the control operates i) to vent the headspace upon the initiator initiating unlatching of the door, ii) to unlatch the door upon the pressure sensor having sensed that the headspace has been vented, and iii) to prevent the headspace from being pressurized unless the closure sensor signals that the closure is in its closed condition.

The foregoing, and other features, along with various advantages and benefits of the invention, will be seen in the ensuing description and claims which are accompanied by drawings. The drawings discloses a preferred embodiment of the invention according to the best mode contemplated at this time for carrying out the invention.

DESCRIPTION OF THE PREFERRED EMBODIMENT

Figure 1:
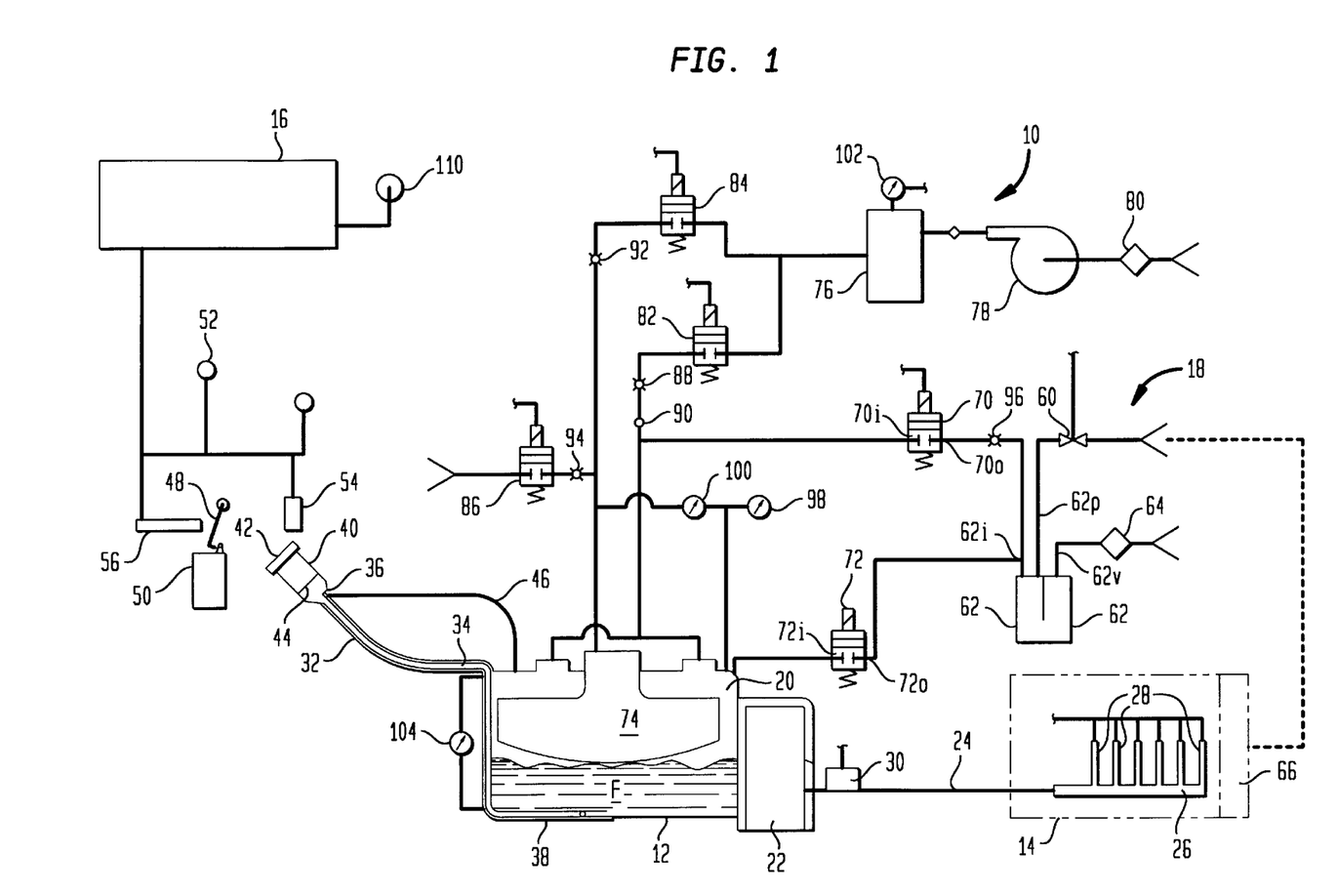
FIG. 1 is a schematic diagram of an exemplary fuel vapor management system embodying principles of the invention.

FIG. 1 shows an exemplary fuel vapor management system 10 of a motor vehicle comprising a fuel tank 12, an internal combustion engine 14, an engine management computer, (sometimes referred to as an EMC) 16, and a vapor collection system 18.

Fuel tank 12 is designed to have a shape and geometry suited to fit the particular vehicle in which it is installed. Regardless of the particular shape and geometry, the tank comprises an interior volume for containing a supply of volatile liquid fuel for the vehicle. FIG. 1 shows a representative quiescent (i.e., non-sloshing) condition where the tank interior volume is only partially filled with liquid fuel F. Overlying the liquid fuel is a headspace 20 that contains a gaseous mixture of volatilized fuel and air. A liquid fuel flow path for withdrawing liquid fuel from fuel tank 12 and delivering the fuel to engine 14 for mixture with induction air and ensuing combustion in the engine's combustion chambers comprises: a fuel pump, (or fuel pump module), 22 within tank 12 and a fuel supply conduit 24 leading to an engine-mounted fuel rail 26 serving fuel injectors 28 of engine 14. FIG. 1 shows a fuel sensor 30 in association with conduit 24 for detecting the nature of the fuel being supplied to engine 14, (an ethanol sensor, for example), and delivering a signal indicative of the fuel character to engine management computer (EMC) 16. Liquid fuel is introduced into tank 12 via a filler neck assembly 32, sometimes referred to simply as a fill, filler neck, or filler tube.

Filler neck assembly 32 comprises a fill conduit 34 having an orifice 36 proximate the conduit's entrance. The exit of conduit 34 is at the bottom of tank 12 and contains a check valve 38 for allowing fuel to pass into the tank from conduit 34 but preventing backflow from the tank into the conduit. Filler neck assembly 32 further comprises an entrance 40 shaped to accept a typical nozzle (not shown) of a service station fuel dispensing pump. Orifice 36 is disposed proximate the inner end of entrance 40 for closely fitting circumferentially around the outside of such a nozzle's end when the nozzle has been properly inserted into entrance 40. The outer end of entrance 40 contains a removable closure 42, such as a threaded filler cap, that is selectively positionable to selectively assume a first condition of closure of the fill for closing the fill and sealing it and the tank interior volume from atmosphere (the condition portrayed by FIG. 1) and a second condition of non-closure of the fill for allowing insertion of a service station fuel dispensing pump nozzle. Intermediate its inner and outer ends, entrance 40 comprises a partition having a centrally disposed, spring-biased door 44 that is normally shut, but that is pushed open by the end of a fuel dispensing nozzle as the latter is being inserted into entrance 40 preparatory to dispensing liquid fuel into the tank. A recirculation conduit, or recirculation line, 46 communicates the tank headspace 20 with the interior of entrance 40 at a location between orifice 36 and door 44.

The body of the vehicle contains an access door 48 that when open, allows access to closure 42, but when closed, disallows access. FIG. 1 shows a solenoid operated latch mechanism 50 associated with access door 48. Access door 48 is normally latched closed by mechanism 50, but is spring-loaded to open by spring force upon release of the latch mechanism. Opening of door 48 is initiated by operation of an opener, such a remotely located pushbutton switch 52 inside the vehicle passenger compartment for example. When pushbutton switch 52 is pressed, a signal is delivered to EMC 16, which then operates to cause latch mechanism 50 to unlatch access door 48, provided that certain conditions in the fuel tank are appropriate for allowing removal of closure 42. FIG. 1 further shows a closure sensor 54 for distinguishing between the presence and the absence of closure 42 from the outer end of entrance 40, and hence distinguishing between the tank interior being closed to atmosphere and being open to atmosphere via filler neck assembly 32. A sensor 56 is associated with access door 48 for distinguishing between open and closed conditions of the access door. Both sensors 54 and 56 provide respective signals to EMC 16 to indicate the respective conditions of closure 42 and access door 48.

Fuel vapor collection system 18 is associated with tank 12 and comprises a CPS (canister purge solenoid) valve 60 and a vapor collection canister 62, each of which may be any of a number of known devices. Basically, the interior of collection canister 62 contains a medium for adsorbing volatile fuel vapors communicated to it via a vapor inlet port 62i. The canister has a purge port 62p communicated to an inlet port of CPS valve 60, and an atmospheric vent port 62v, the latter of which may communicate to atmosphere through a particulate filter 64. An outlet port of CPS valve 60 communicates with an intake manifold 66 of engine 14. CPS valve 60 is under the control of engine management computer 16 for disposing of the collected fuel vapors by periodically purging them from canister 62 to intake manifold 66 where they entrain with induction air for subsequent combustion in the engine combustion chambers. Inlet port 62i of canister 62 is not directly communicated to tank headspace 20 because of the incorporation of certain components of the inventive system, which will now be described.

The disclosed embodiment shows a tank vapor headspace vent control comprising a solenoid operated tank vent valve 70 and a solenoid operated re-fuel valve 72, both of which are functionally associated with a ventway that extends between canister 62 and the fuel vapor headspace 20 of tank 12. One or more locations of headspace 20, preferably its highest elevation(s), is (are) communicated to an inlet port 70i of tank vent valve 70. Likewise, one or more locations of headspace 20 (which may or may not be the same as the locations communicated to inlet port 70i) are communicated to an inlet port 72i of re-fuel valve 72. For example, FIG. 1 shows two locations of tank 12 where inlet port 70i is communicated to headspace 20, while only a single, but different, location is communicated to inlet port 72i. An outlet port 70o of valve 70 is communicated to canister inlet port 62i, and an outlet port 72o of valve 72 is communicated to canister inlet port 62i. Each valve 70, 72 is normally closed, but is operated open when its solenoid is energized. The solenoids are under the control of engine management computer 16.

The ventway between tank vapor headspace 20 and canister 62 thus comprises two parallel flow branches. The first branch comprises a normally closed tank headspace vent valve (valve 70) between the tank headspace and vapor collection system 18, wherein vent valve 70 is selectively operated by engine management computer 16 to vent tank vapor headspace 20 to vapor collection system 18. The second branch comprises re-fuel valve 72. Each valve 70, 72 is independently selectively operable to respective open and closed conditions.

The inventive system further comprises a variable volume, fuel-impermeable enclosure 74, shown in this embodiment as a bladder having a fuel-impermeable wall, disposed within the tank interior volume. Bladder 74 is expandable and contractible in volume to reduce the volume disposed within the tank interior volume. Bladder 74 is expandable and contractible in volume to reduce the volume of the tank vapor headspace 20 by the volume of the bladder. A source of environmentally non-hazardous gas at superatmospheric pressure, such as compressed air, is provided by an air tank, or reservoir, 76 that stores the pressurized air. A pressurizing pump, or compressor, 78 draws air from atmosphere and pumps it into the air tank to create the superatmospheric pressure air in the air tank. Pump 78 made be powered either electrically from the vehicle's electrical system, or mechanically from the engine itself. The pump inlet preferably communicates to atmosphere via a particulate filter 80.

The inventive system further comprises a pressurize control for introducing superatmospheric pressure air from tank 76 both into tank vapor headspace 20 to pressurize the tank headspace to superatmospheric pressure and into bladder 74 to pressurize the bladder to superatmospheric pressure. This pressurize control comprises a headspace pressurizing flow path for selectively communicating tank headspace 20 to air tank 76 and a bladder pressurizing flow path for selectively communicating bladder 74 to air tank 76. The headspace pressurizing flow path comprises a solenoid operated tank pressurize valve 82 for controlling flow through a conduit extending between air tank 76 and tank headspace 20. Tank pressurize valve 82 is normally closed to disallow communication of pressurized air to headspace 20, but operates from closed to open in response to a command from EMC 16 to convey superatmospheric pressure air from tank 76 to headspace 20.

The bladder pressurizing flow path comprises a solenoid operated bladder pressurize valve 84 for controlling flow through a conduit extending between air tank 76 and bladder 74. Bladder pressurize valve 84 is normally closed to disallow communication of pressurized air to bladder 74, but operates from closed to open in response to a command from engine management computer 16.

A solenoid operated bladder vent valve 86 is disposed in a flow path for controlling flow between bladder 74 and atmosphere. In the illustrated embodiment, valve 86 is teed into the conduit that extends from bladder 74 to air tank 76. Bladder vent valve 86 is normally closed to disallow communication of bladder 74 to atmosphere, but operates from closed to open in response to a command from engine management computer 16 to vent the bladder to atmosphere. Tank pressurize valve 82, bladder pressurize valve 84, and bladder vent valve 86 are each independently selectively operable to respective open and closed conditions.

Certain additional components are shown to be employed in the illustrated embodiment. A flow control valve 88 and a check valve 90 are disposed in series in the portion of the flow path extending between tank pressurize valve 82 and headspace 20. A flow control valve 92 is disposed in the portion of the flow path extending between bladder pressurize valve 84 and bladder 74. A flow control valve 94 is disposed in the portion of the flow path extending between bladder vent valve 86 and the point of the valve's tee connection to the conduit to bladder 74. A flow control valve 96 is disposed in the portion of the flow path extending between tank vent valve 70 and canister inlet port 62*i*. The flow control valves may be simply fixed orifice restrictors.

A tank headspace pressure sensor 98 is disposed to sense tank headspace pressure. A tank headspace/bladder differential pressure sensor 100 is disposed to sense the difference between the tank headspace pressure and the bladder pressure. An air tank pressure sensor 102 is disposed to sense pressure in air tank 76. Because of the presence of bladder 74, it may not be appropriate to utilize a known float-type sender to measure the amount of liquid fuel in the tank, and so the illustrated embodiment employs a differential pressure sensor 104 instead to sense the liquid fuel level in tank 12. Sensors 98, 100, and 102 supply respective signals to EMC 16.

Figure 2A:
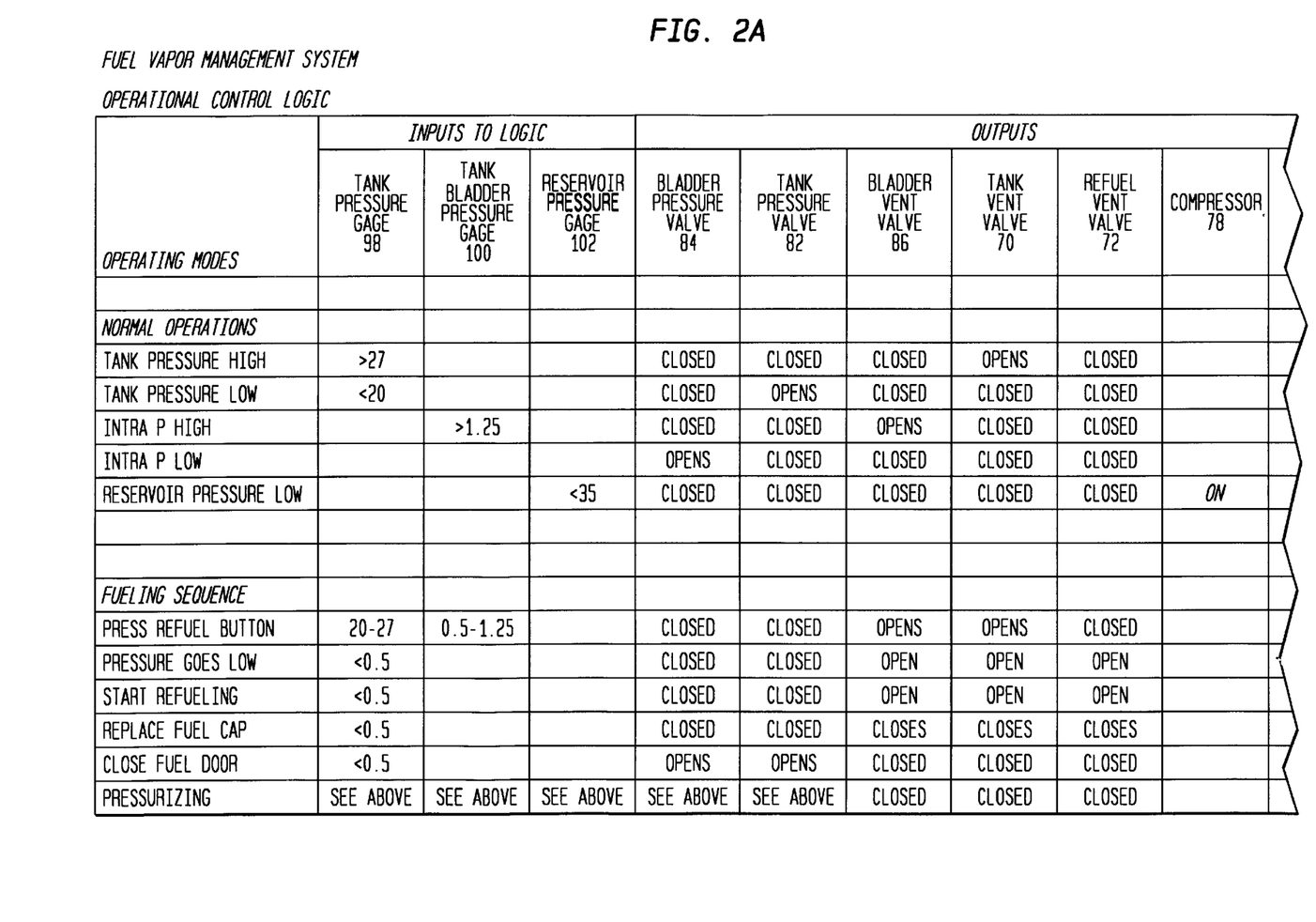
FIG. 2 is a logic table depicting various inputs and resultant operations.
Figure 2B:
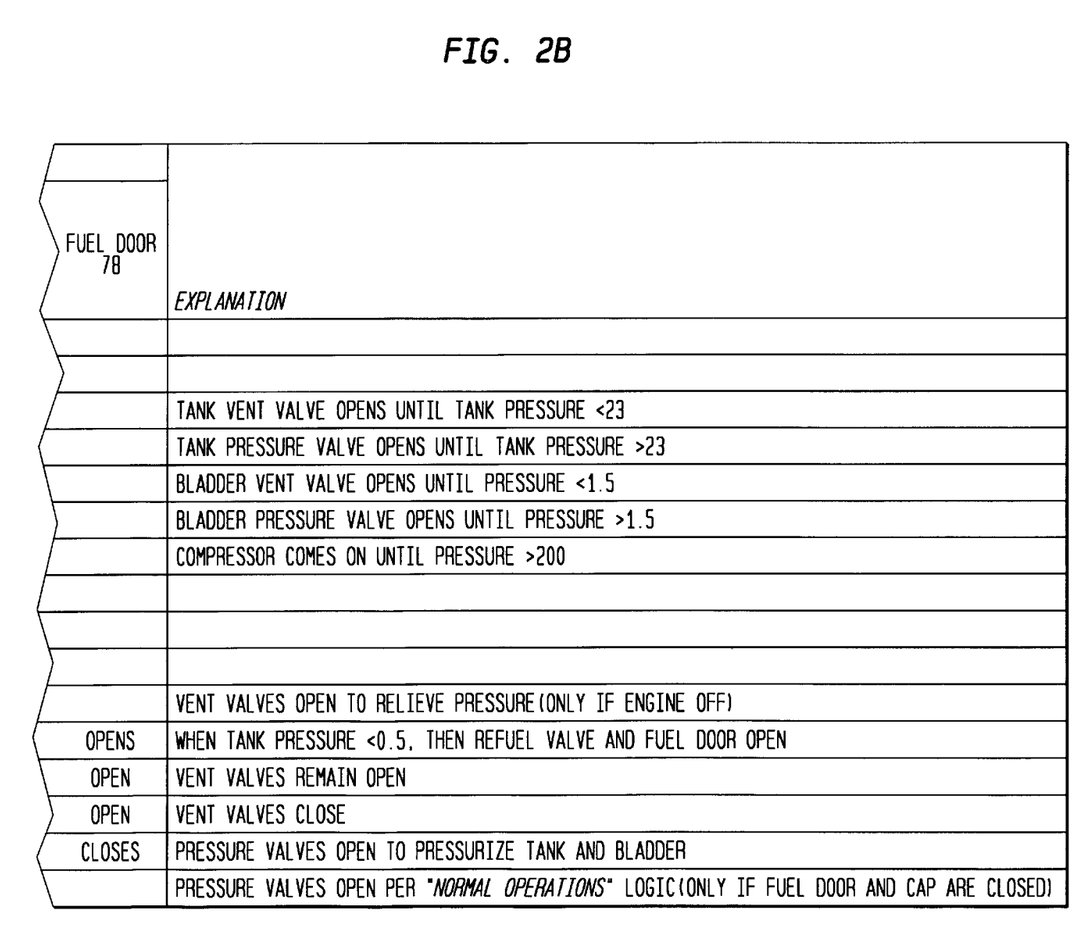

FIG. 2 depicts two operational modes, one called "normal operations", and the other, "refueling sequence". "Normal operations" refers to operations that can occur when closure 42 is in place and access door 48 is latched closed, preventing access to closure 42. The operation of the system will now be described for the "normal operations" mode.

During "normal operations" mode, various valves are operated to cause the superatmospheric pressures in the bladder and the tank vapor headspace to be regulated to a predetermined relationship, both when the engine is off and when liquid fuel is being withdrawn from the tank as the engine runs. The pressures are regulated to cause the pressure in the bladder to be at least as great as that in the vapor headspace, preferably within a range wherein the bladder pressure is regulated to a predetermined range above vapor headspace pressure, such as between 1.25 and 1.50 inches of water greater, as in the present example being discussed.

The bladder and tank are preferably constructed such that the tank headspace volume that is displaced by the bladder is maximized to the extent appropriate for a given fuel tank shape and geometry. By constructing and regulating the relative tank and bladder pressures in this manner, volatilization of liquid fuel in the tank is attenuated. Purging of the canister to the engine intake manifold can be performed at appropriate times by EMC 16 opening CPS valve 60.

The manner by which relative pressure regulation is attained during "normal operations" can be explained with reference to the logic table of FIG. 2. As long as the pressure differential sensed by sensor 100 lies within the aforementioned predetermined range, and the pressure sensed by sensor 98 lies within a predetermined range (20 and 27 inches of water, in the present example being described), valves 70, 72, 82, 84, and 86 are closed.

If the pressure differential sensed by sensor 100 falls below the 1.25 inches of water limit while the pressure sensed by sensor 98 remains within its aforementioned predetermined range of 20 and 27 inches of water, EMC 16 causes valve 84 to be operated open while the other four valves remain closed. As a result, air tank 76 supplies air that raises the pressure in the bladder. When sensor 100 indicates that the differential has reached the 1.50 inches of water limit, EMC 16 causes valve 84 to close.

If the pressure differential rises above the 1.50 inches of water limit while the pressure sensed by sensor 98 remains within its aforementioned predetermined range of 20 and 27 inches of water, EMC 16 causes valve 86 to open while the other four valves remain closed. As a result, air is bled from the bladder to reduce the pressure therein, with the flow rate being established by flow control valve 94. When sensor 100 indicates that the differential has fallen to the 1.50 inches of water limit, EMC 16 causes valve 86 to close.

If the pressure sensed by sensor 98 rises above 27 inches of water, EMC 16 causes valve 70 to open while the other four valves remain closed. As a result, air/fuel vapor mixture is bled from the tank vapor headspace to the canister to reduce the pressure in the tank vapor headspace, with the flow rate being established by flow control valve 96. When sensor 98 senses that the pressure has fallen to 23 inches water, EMC 16 causes valve 70 to close.

If the pressure sensed by sensor 98 drops below 20 inches of water, EMC 16 operates valve 82 open while the other four valves remain closed. As a result, air is delivered from air tank 76 to tank vapor headspace 20, with the flow rate being established by flow control valve 90. When sensor 98 senses that the pressure has risen to 23 inches water, EMC 16 causes valve 82 to close.

Whenever the pressure in air tank 76 drops below a predetermined value, compressor 78 operates to restore the pressure. In this way, an ample supply of pressurized air is always readily available for pressurizing both the bladder and the tank vapor headspace.

The "refueling sequence" mode occurs whenever fuel is to be dispensed into the fuel tank via the filler tube assembly. The pushbutton switch 52 is operated to initiate this mode. Provided that the engine is not running, as determined by an appropriate signal, such as from a sensor 110, valves 72 and 86 are operated open by EMC 16 while the other valves remain closed. When the pressure in the tank vapor headspace, as sensed by sensor 98, has fallen to substantially atmospheric pressure, such as 0.5 inch water relative atmosphere, EMC 16 operates latch mechanism 50 to unlatch and therefore open access door 48. Concurrently, EMC 16 causes re-fuel valve 72 to open. Closure 42 is then removed, and after a fuel dispensing nozzle (not shown in the drawing) has been properly inserted into the filler tube assembly through door 44, fuel can be dispensed into the fuel tank. The combined volumes of the bladder and the tank vapor headspace decrease with the increase in volume of liquid fuel introduced into the tank.

Once the re-fueling has been completed and the fuel nozzle withdrawn, closure 42 is re-closed. Sensor 54 signals this closure to EMC 16 which in turn causes valves 70, 72, and 86 to close. When access door 48 is latched closed, sensor 56 signals EMC 16, which then causes valves 82 and 94 to open and re-pressurize tank headspace 20 to a pressure within its regulated pressure range and bladder 74 to a pressure within the range to which it is regulated relative to the vapor headspace pressure. Compared to its volume before re-fueling, the volume of the bladder has been reduced due to the increase in volume of liquid fuel introduced into the tank. As the engine runs and fuel is withdrawn from the tank, the bladder will progressively increase in volume, consistent with the "normal operations" mode described above.

If the closure sensor 54 failed to detect proper re-sealing of closure 42, a warning signal would have been given, and the re-pressurizing of the tank and bladder would not occur. By making the volume of air tank 76 sufficiently large, pressures can be maintained for some period of time while the vehicle is not running without operating pump 78. By using an air tank as an accumulator, the size of pump 78 can be rather small.

Where a leak detection system, such as that shown in any of a number of commonly assigned patents (U.S. Pat. No. 5,146,902 for example), is present, the pressurized air supply provided by tank 76 and compressor 78 can be used both for vapor attenuation, as described above, and for pressurizing that portion of the fuel vapor space that is upstream of the purge valve inlet. Testing can also be performed for any leakage in the bladder. Another way to detect leakage is by EMC 16 monitoring duty cycles of the tank pressurize and bladder pressurize valves.

Because the inventive system significantly attenuates vapor generation, it is prospectively possible to even eliminate a collection canister so that disposal of fuel vapors could be accomplished by venting of the tank headspace directly to the engine, rather than to the intervening temporary storage provided by a collection canister.

The EMC 16 is programmed in accordance with known programming methods to perform the control logic described herein, and as depicted in FIG. 2.

Thus, the invention provides a new and unique improvement possessing important advantages and benefits. While a presently preferred embodiment of the invention has been illustrated and described, it should be appreciated that principles of the invention apply to all embodiments falling within the scope of the following claims.

What is claimed is:

1. A system for closed storage of volatile liquid fuel comprising:
   a) a tank defining an interior volume for holding volatile liquid fuel and for providing a headspace for volatilized fuel; and
   b) a system for attenuating the volatilization of liquid fuel in the tank interior volume which comprises:
      1) an enclosure that comprises a fuel-impermeable wall disposed within the tank interior volume and that is expandable and contractible in volume to reduce the volume of the tank headspace for volatilized fuel by the volume of the enclosure;
      2) a source of environmentally non-hazardous gas at superatmospheric pressure; and
      3) a control for introducing superatmospheric pressure gas from the source both into the tank headspace to pressurize the tank headspace to superatmospheric pressure and into the enclosure to pressurize the enclosure to superatmospheric pressure.

2. A system as set forth in claim 1 including a liquid fuel flow path for withdrawing liquid fuel from the fuel tank, and wherein the enclosure comprises a bladder that is expandable and contractible in volume, and the control includes valving for causing the superatmospheric pressures in the bladder and the tank headspace to be regulated to maintain the bladder at a superatmospheric pressure at least as great as the superatmospheric pressure in the tank headspace as liquid fuel is withdrawn from the tank via the liquid fuel flow path.

3. A system as set forth in claim 2 wherein the control comprises a first gas flow path for selectively communicating the tank headspace to the source of environmentally non-hazardous gas at superatmospheric pressure and a second gas flow path for selectively communicating the bladder to the source of environmentally non-hazardous gas at superatmospheric pressure.

4. A system as set forth in claim 3 wherein the first flow path comprises a normally closed tank pressurize valve that operates from closed to open to convey superatmospheric pressure gas from the source to the tank headspace, the second flow path comprises a normally closed bladder pressurize valve that operates from closed to open to convey superatmospheric pressure gas from the source to the bladder, and the tank pressurize valve and the bladder pressurize valve are each independently selectively operable to respective open and closed conditions.

5. A system as set forth in claim 4 further including a third flow path containing a normally closed headspace vent valve between the tank headspace and a vapor collection system, wherein the headspace vent valve is selectively operable to vent the tank headspace to the vapor collection system, and a fourth flow path containing a normally closed bladder vent valve between the bladder and atmosphere, wherein the bladder vent valve is selectively operable to vent the bladder to atmosphere.

6. A system as set forth in claim 5 further including a fifth flow path in parallel with the third flow path and containing a normally closed re-fueling valve between the tank headspace and a vapor collection system, wherein the re-fueling valve is selectively operable to vent the tank headspace to the vapor collection system.

7. A system as set forth in claim 6 wherein the vapor collection system comprises a vapor collection medium having a vapor inlet port that is communicated to both the re-fueling valve and the headspace vent valve.

8. A system as set forth in claim 4 wherein the first flow path further comprises at least one additional valve in series flow relation with the tank pressurize valve.

9. A system as set forth in claim 8 wherein the at least one additional valve in series flow relation with the tank pressurize valve comprises a check valve that allows flow from the source to the tank headspace, but not vice versa, and a flow control valve for controlling the rate of flow through the first flow path.

10. A system as set forth in claim 9 wherein the flow control valve comprises a fixed orifice restrictor.

11. A system as set forth in claim 1 wherein the source of environmentally non-hazardous gas at superatmospheric pressure comprises a source of atmospheric air at superatmospheric pressure.

12. A system as set forth in claim 11 wherein the source of atmospheric air at superatmospheric pressure comprises an air tank for storing superatmospheric pressure air, and a pressurizing pump for pumping atmospheric air into the air tank to create superatmospheric pressure air in the air tank.

13. A system as set forth in claim 12 wherein the control comprises a first gas flow path between the air tank and the fuel tank headspace and a second gas flow path between the air tank and the enclosure.

14. A system as set forth in claim 13 wherein the first flow path comprises a first valve for selectively communicating the fuel tank headspace with the air tank and the second flow path comprises a second valve for selectively communicating the enclosure with the air tank.

15. A system as set forth in claim 14 including a third flow path from the fuel tank headspace to a vapor collection medium, wherein the third flow path comprises a third valve for selectively communicating the fuel tank headspace with the vapor collection medium, and a fourth flow path containing a fourth valve between the enclosure and atmosphere, wherein the fourth valve is selectively operable to vent the enclosure to atmosphere.

16. A system as set forth in claim 1 wherein the control operates to cause the pressures in the enclosure and the tank headspace to be regulated to provide a superatmospheric pressure in the bladder that is greater than the superatmospheric pressure in the tank headspace.

17. For an automotive vehicle having:
 a) a fuel-consuming engine;
 b) a fuel tank defining an interior volume for containing volatile liquid fuel that is to be consumed by the engine and for providing a headspace for volatilized fuel;
 c) a fill via which volatile liquid fuel is introduced into the tank interior volume; and
 d) a closure that is selectively positionable relative to the fill to selectively assume a first condition of closure of the fill for sealing the tank interior volume from atmosphere and a second condition of non-closure of the fill for allowing introduction of liquid fuel into the tank interior volume via the fill:
a fuel vapor control and containment system for control and containment of volatilized fuel which comprises:
 1) a variable volume enclosure disposed within the tank interior volume to reduce the volume of the tank headspace by the volume of the enclosure;
 2) a source of environmentally non-hazardous gas at superatmospheric pressure;
 3) plural controlled flow paths comprising a) a first controlled flow path for selectively communicating the tank headspace to the gas source, b) a second controlled flow path for selectively communicating the tank headspace to a vapor disposal zone, c) a third controlled flow path for selectively communicating the enclosure to the gas source, and d) a fourth controlled flow path for selectively communicating the enclosure to atmosphere;
 4) a sensor for distinguishing between the first condition and the second condition of the closure; and
 5) wherein the fuel vapor control and containment system operates to i) allow the first, second, third, and fourth controlled flow paths to selectively control the respective flows when the closure is in its first condition, ii) to disallow the third controlled flow path from selectively communicating the enclosure to the gas source when the closure is in its second condition, and iii) disallow the first controlled flow path from selectively communicating the tank headspace to the gas source when the closure is in its second condition.

18. For an automotive vehicle as set forth in claim 17 wherein the automotive vehicle further has a closure access that is selectively operable to allow and disallow access to the closure,
 the system further iv) causing the second and fourth controlled flow paths to be open in response to the closure access operating from disallowing to allowing access to the closure.

19. For an automotive vehicle as set forth in claim 18, the second controlled flow path comprising a valve that is normally closed to disallow communication of the tank headspace with the vapor disposal zone, but that operates from closed to open in response to the closure access operating from disallowing to allowing access to the closure, to thereby communicate the tank headspace with the vapor disposal zone.

20. For an automotive vehicle as set forth in claim 19, the first controlled flow path comprising a tank pressurize valve.

21. For an automotive vehicle as set forth in claim 19, the tank pressurize valve being normally closed, but operating from closed to open to convey superatmospheric pressure gas from the gas source to the tank headspace.

22. For an automotive vehicle as set forth in claim 21, the gas source comprising an air tank for storing superatmospheric pressure air, a pressurizing pump for pumping atmospheric air into the air tank to create pressurized air in the air tank, and at least one valve, that is additional to the tank pressurize valve, in the first flow path.

23. For an automotive vehicle as set forth in claim 22, the at least one additional valve in the first flow path comprising, in series flow relation, a check valve that allows flow from the air tank to the fuel tank headspace, but not vice versa, and a flow control valve for controlling the flow rate.

24. For an automotive vehicle as set forth in claim 23, the flow control valve comprising a fixed orifice restrictor.

25. For an automotive vehicle as set forth in claim 23, the third controlled flow path comprising an enclosure pressurize valve through which pressurized gas is conveyed from the gas source to the enclosure and an enclosure vent valve through which the enclosure is vented to atmosphere, the enclosure vent valve and the enclosure pressurize valve each being independently selectively operable to an open condition and to a closed condition.

26. For an automotive vehicle as set forth in claim 23, the enclosure control flow path comprising a normally closed enclosure pressurizing valve that opens to convey pressurized gas from the gas source to the enclosure and a normally closed enclosure vent valve that opens to vent the enclosure to atmosphere.

27. For an automotive vehicle as set forth in claim 26, the gas source comprising an air tank for storing superatmospheric pressure air and a pressurizing pump for pumping atmospheric air into the air tank to create superatmospheric pressure air in the air tank, the first controlled flow path comprising a check valve that allows flow from the air tank to the fuel tank headspace, but not vice versa.

28. For an automotive vehicle as set forth in claim 17, the gas source comprising an air tank for storing superatmospheric pressure air and a pressurizing pump for pumping air into the air tank to create superatmospheric pressure air in the air tank, the first controlled flow path comprising a fuel tank pressurize valve for selectively communicating the air tank to the fuel tank headspace, and the third controlled flow path comprising an enclosure pressurize valve through which superatmospheric pressure air is conveyed from the air tank to the enclosure.

29. For an automotive vehicle as set forth in claim 28, the third controlled flow path comprising a normally closed enclosure vent valve that opens to vent the enclosure to atmosphere, the enclosure vent valve and the enclosure pressurize valve each being independently selectively operable to an open condition and to a closed condition.

30. For an automotive vehicle as set forth in claim 17, the control causing pressure in the bladder to be regulated to a pressure greater than the pressure in the tank headspace when the closure is in its first condition.

31. For an automotive vehicle having:
 a) a fuel-consuming engine;
 b) a fuel tank defining an interior volume for containing volatile liquid fuel that is to be consumed by the engine and for providing a headspace for volatilized fuel;

c) a fill via which volatile liquid fuel is introduced into the tank interior volume;

d) a closure that is selectively positionable relative to the fill to selectively assume a first condition of closure of the fill for sealing the tank interior volume from atmosphere and a second condition of non-closure of the fill for allowing introduction of liquid fuel into the tank interior volume via the fill; and f) a fuel vapor control and containment system for control and containment of volatilized fuel;

the combination comprising:
1) a control for pressurizing a headspace of the tank interior to superatmospheric pressure and for venting the headspace;
2) a closure sensor for distinguishing between the first condition and the second condition of the closure;
3) an access door that is selectively positionable to allow and disallow access to the closure, including a releasable latching mechanism for releasably latching the door closed to disallow access to the closure;
4) an initiator for initiating unlatching of the door;
5) a position sensor for distinguishing between a first position of the door that allows access to the closure and a second position of the door that disallows access to the closure;
6) a pressure sensor for sensing tank headspace pressure; and
7) wherein the control operates i) to vent the headspace upon the initiator initiating unlatching of the door, ii) to unlatch the door upon the pressure sensor having sensed that the headspace has been vented; and iii) to prevent the headspace from being pressurized unless the closure sensor signals that the closure is in its first condition.

* * * * *